US008813490B2

(12) United States Patent
Wada

(10) Patent No.: US 8,813,490 B2
(45) Date of Patent: Aug. 26, 2014

(54) INTERNAL COMBUSTION ENGINE EXHAUST EMISSION CONTROL DEVICE AND EXHAUST EMISSION CONTROL METHOD

(75) Inventor: Katsuji Wada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 641 days.

(21) Appl. No.: 13/148,035

(22) PCT Filed: Feb. 5, 2010

(86) PCT No.: PCT/JP2010/000701
§ 371 (c)(1),
(2), (4) Date: Aug. 4, 2011

(87) PCT Pub. No.: WO2010/090035
PCT Pub. Date: Aug. 12, 2010

(65) Prior Publication Data
US 2011/0289918 A1    Dec. 1, 2011

(30) Foreign Application Priority Data
Feb. 6, 2009   (JP) .................................. 2009-025989

(51) Int. Cl.
*F02B 33/44*   (2006.01)
*F02M 25/07*   (2006.01)
*F02D 41/00*   (2006.01)
*F02D 41/02*   (2006.01)
*F02D 9/02*    (2006.01)

(52) U.S. Cl.
CPC ....... *F02D 41/0065* (2013.01); *F02M 25/0707* (2013.01); *F02M 25/0709* (2013.01); *F02M 25/0718* (2013.01); *F02D 41/0055* (2013.01); *F02D 41/0275* (2013.01); *F02D 9/02* (2013.01); *Y02T 10/47* (2013.01)
USPC ................ 60/605.2; 60/278; 60/280; 60/295; 60/301

(58) Field of Classification Search
CPC .......... F02M 25/0717; F02M 25/0718; F02M 25/071; F01N 3/0871
USPC .................... 60/278, 280, 282, 295, 299, 301
See application file for complete search history.

(56) References Cited

FOREIGN PATENT DOCUMENTS

EP      1 965 050 A1    9/2008
JP      3074561 A       3/1991
(Continued)

OTHER PUBLICATIONS

Supplementary European Search Report issued to EP Application No. 10738376, mailed Jan. 16, 2012.

*Primary Examiner* — Thomas Denion
*Assistant Examiner* — Philip Eklem
(74) *Attorney, Agent, or Firm* — Arent Fox LLP

(57) ABSTRACT

An exhaust emission control device for an internal combustion engine is provided that can suppress the adherence of HC to an EGR path and the like accompanying enrichment of the exhaust air/fuel ratio. The exhaust emission control device includes: a high-pressure EGR path 6 that recirculates a portion of the exhaust gas upstream of a turbine 81 into an intake manifold 3; a high-pressure EGR control portion 43; a low-pressure EGR path 10 that recirculates a portion of the exhaust gas downstream of the turbine 81 into intake plumbing 2; a low-pressure EGR control portion 44; a NOx purification catalyst 31 that is provided inside exhaust plumbing 4 downstream of an exhaust inlet of the low-pressure EGR path 10, traps NOx under an oxidizing atmosphere, and purifies the trapped NOx under a reducing atmosphere; a NOx purification catalyst reduction control unit 41 that performs reduction control of the exhaust air/fuel ratio; and an EGR switching portion 45 that selects recirculation control of exhaust gas by the low-pressure EGR control portion 44 in a case of the exhaust air/fuel ratio being at least a predetermined threshold value, and selects recirculation control of exhaust gas by the high-pressure EGR control portion 43 in a case of being lower than the threshold value.

6 Claims, 4 Drawing Sheets

(56) References Cited

FOREIGN PATENT DOCUMENTS

| | | |
|---|---|---|
| JP | 2675405 B2 | 7/1997 |
| JP | 2001-140703 A | 5/2001 |
| JP | 2002-276405 A | 9/2002 |
| JP | 2004-150319 A | 5/2004 |
| JP | 2005-127247 A | 5/2005 |
| JP | 2005-194927 A | 7/2005 |
| JP | 2006-233898 A | 9/2006 |
| JP | 2008-101530 A | 5/2008 |
| JP | 2008-106658 A | 5/2008 |
| WO | WO 2008/050900 A1 | 5/2008 |

INTERNAL COMBUSTION ENGINE EXHAUST EMISSION CONTROL DEVICE AND EXHAUST EMISSION CONTROL METHOD

CROSS REFERENCED TO RELATED APPLICATION

This application is a National Stage entry of International Application No. PCT/JP2010/000701, filed Feb. 5, 2010, which claims priority to Japanese Patent Application No. 2009-025989 filed Feb. 6, 2009, the disclosure of the prior application is incorporated in its entirety by reference.

TECHNICAL FIELD

The present invention relates to an internal combustion engine emission control device and an exhaust emission control method. In particular, it relates to an internal combustion engine emission control device equipped with a NOx purification catalyst that traps NOx contained in the exhaust emitted from the internal combustion engine when lean, and reduces the NOx thus trapped when rich.

It should be noted that, in the present invention, the terminology "rich" indicates a ratio of air/fuel (hereinafter referred to as "air/fuel ratio" or "A/F") of fuel that is smaller than a stoichiometric air/fuel ratio, and the terminology "lean" indicates an air/fuel ratio of fuel that is larger than the above stoichiometric air/fuel ratio. In addition, in the following explanation, a weight ratio of air and fuel in a mixed gas flowing into the internal combustion engine (hereinafter referred to as "engine") is defined as the engine air/fuel ratio, and a weight ratio of air and fuel inside an exhaust path is defined as the exhaust air/fuel ratio.

BACKGROUND ART

Technology has been known in which a NOx purification catalyst called a three-way catalyst (hereinafter referred to as TWC), NOx occlusion/reduction catalyst (hereinafter referred to as LNT) or NOx adsorption/reduction catalyst (hereinafter referred to as LNC) is installed in the exhaust path of an engine, and switching control of the exhaust A/F to rich or lean is intermittently performed. The NOx purification catalyst purifies NOx in the exhaust gas by trapping the NOx in the exhaust gas when lean and reducing the NOx thus trapped when rich.

Methods of controlling the exhaust A/F to rich that can be exemplified are a method of controlling the exhaust A/F by adjusting the fuel injection (hereinafter referred to as main injection) amount contributing to torque (hereinafter referred to s rich combustion) after causing the intake air amount to decrease by closing the throttle valve or the like, and a method of causing uncombusted fuel to flow into the exhaust path to control the exhaust A/F to rich, by injecting additional fuel not contributing to torque (hereinafter referred to as post injection) into the cylinders by way of fuel injectors close to when each cylinder of the engine is transitioning to the exhaust stroke from the power stroke (hereinafter referred to as post rich).

In addition, technology has been known whereby a portion of the exhaust gas of the engine is returned to the intake, and the combustion temperature in the cylinders is made to decrease by mixing new air and exhaust gas, whereby the NOx emitted from the engine is decreased (hereinafter referred to as EGR). According to this EGR technology, the exhaust A/F can be controlled to rich by causing the intake air amount to decrease by increasing the exhaust gas amount being recirculated (hereinafter referred to as EGR amount), whereby NOx emissions can be decreased.

Studies with the objective of reducing NOx emissions further have progressed by combining control technology for exhaust A/F using the above-mentioned NOx purification catalyst and EGR technology. For example, an exhaust emission control device has been proposed that includes an EGR device executing switching between recirculation of exhaust gas from an upstream side of a NOx purification catalyst and recirculation of exhaust gas from a downstream side of the NOx purification catalyst (refer to Patent Document 1). With this exhaust emission control device, control is executed such that the exhaust gas from the upstream side of the NOx purification catalyst is made to recirculate during low engine load, and the exhaust gas from the downstream side of the NOx purification catalyst is made to recirculate during high engine load.

In addition, studies have progressed into applying control technology for exhaust A/F using the above-mentioned NOx purification catalyst and EGR technology to an engine that implements forced induction by way of a turbocharger. For example, in engines implementing forced induction by way of a turbocharger, both high-pressure EGR (hereinafter referred to as HP-EGR) introduction in which a portion of the exhaust gas is taken from upstream of the turbine and returned to the intake path, and low-pressure EGR (hereinafter referred to as LP-EGR) in which a portion of the exhaust gas is taken from downstream of the turbine and returned to the intake path are known (refer to Patent Documents 2 to 4). Switching between an HP-EGR path and LP-EGR path is executed according to operating states such as of the engine revolution speed and engine load.

Patent Document 1: Japanese Patent No. 2675405
Patent Document 2: Japanese Unexamined Patent Application Publication No. 2001-140703
Patent Document 3: Japanese Unexamined Patent Application Publication No. 2004-150319
Patent Document 4: Japanese Unexamined Patent Application Publication No. 2005-127247

DISCLOSURE OF THE INVENTION

Problems to be Solved by the Invention

However, in a case of the EGR amount being increased with the aim of causing NOx emissions to decline, LP-EGR introduction can suppress a decrease in the exhaust gas amount flowing into the turbine compared to HP-EGR introduction; therefore, it is superior from the viewpoint of fuel economy without causing the charge efficiency to decline. However, it has a characteristic of the temperature of the exhaust flowing inside the EGR path being relatively low.

On the other hand, hydrocarbons (hereinafter referred to as HC) contained in the exhaust gas tend to adhere in a liquid state to the wall surface and the like of the path when the exhaust temperature declines. As a result, in a case of the temperature of the exhaust gas introduced as EGR being low, HC adheres to the wall surface of the EGR path and to devices such as the EGR control value, and malfunctions such as blockage of the EGR path and sticking of the valve tend to occur.

Due to this, in the above-mentioned patent documents, EGR introduction by way of the LP-EGR is executed in a medium-to-high load operating region in which the exhaust gas temperature is relatively high and EC adherence to the EGR path and the like does not easily occur, and EGR introduction by way of the HP-EGR is executed in a low-load operating region in which the exhaust gas temperature is relatively low and HC adherence tends to occur.

However, in a case of performing reduction treatment of NOx trapped by the NOx purification catalyst, it has been required to enrich the exhaust A/F at a point in time at which the NOx amount trapped by the NOx purification catalyst reaches a certain amount, irrespective of the operating load of the engine. In addition, in a case of setting the exhaust A/F to rich, since the HC amount contained in the exhaust gas increases drastically compared to a case of setting to lean, the adherence of HC to the EGR path and the like will be promoted if EGR introduction is executed by way of LP-EGR, for which the exhaust gas temperature is relatively low, when rich.

Furthermore, in a case of post rich being executed while enriching the exhaust A/F, the HC concentration in the exhaust gas for post rich is higher than for combustion rich; therefore, adherence of HC to the EGR path and the like tends to occur.

The present invention has been made taking the above-mentioned issues into account, and has an object of suppressing the adherence of HC to the EGR path and the like accompanying enrichment of the exhaust A/F.

Means for Solving the Problems

In order to achieve the above-mentioned object, according to a first aspect of the invention, in an exhaust emission control device for an internal combustion engine (1) equipped with a turbocharger (8) that drives a compressor (82) provided in an intake path (2, 3) of the internal combustion engine by way of rotation of a turbine (81) provided in an exhaust path (4) of the internal combustion engine, the device includes: a first EGR path (6) that recirculates a portion of exhaust gas upstream of the turbine into the intake path; a first EGR control means (11, 43) for controlling a flow rate of exhaust gas being recirculated through the first EGR path; a second EGR path (10) that recirculates a portion of exhaust gas downstream of the turbine into the intake path; a second EGR control means (12, 44) for controlling a flow rate of exhaust gas being recirculated through the second EGR path; a NOx purification catalyst (31) that is provided inside of the exhaust path downstream of an exhaust gas inlet of the second EGR path, traps NOx under an oxidizing atmosphere, and purifies NOx under a reducing atmosphere; a reduction control means (41) for executing reduction control to make exhaust gas flowing into the NOx purification catalyst into a reducing atmosphere at a predetermined time; and an EGR switching means (45) for selecting recirculation control of exhaust gas by the second EGR control means in a case of the exhaust air/fuel ratio of exhaust gas flowing into the NOx purification catalyst being at least a predetermined threshold value, and for selecting recirculation control of exhaust gas by the first EGR control means in a case of the exhaust air/fuel ratio of exhaust gas flowing into the NOx purification catalyst being less than the threshold value, during execution of the reduction control.

According to a second aspect of the invention, the exhaust emission control device as described in the first aspect further includes a threshold value setting means (45) for setting the threshold value, in which the threshold value setting means sets the threshold value to richer with higher load of the internal combustion engine.

According to a third aspect of the invention, in the exhaust emission control device as described in the first or second aspect, the threshold value setting means sets the threshold value to be richer with higher engine temperature of the internal combustion engine.

According to a fourth aspect of the invention, in the exhaust emission control device as described in the second or third aspect, the threshold value setting means sets the threshold value to be richer with higher cetane number of fuel in use by the internal combustion engine.

According to a fifth aspect of the invention, in the exhaust emission control device as described in any one of the second to fourth aspects, the reduction control means selectively executes, according to an operating state of the internal combustion engine: reduction control according to rich combustion to make exhaust gas flowing into the NOx purification catalyst into a reducing atmosphere by increasing a main injection amount; and reduction control according to post rich to make the exhaust gas flowing into the NOx purification catalyst into a reducing atmosphere by performing post injection, and the threshold value setting means sets the threshold value during execution of the reduction control according to rich combustion to be richer than during execution of the reduction control according to post rich.

According to a sixth aspect of the invention, in an exhaust emission control method for an internal combustion engine (1) including: a turbocharger (8) that drives a compressor (82) provided in an intake path (2, 3) of the internal combustion engine by way of rotation of a turbine (81) provided in an exhaust path (4) of the internal combustion engine; a first EGR path (6) that recirculates a portion of exhaust gas upstream of the turbine into the intake path; a first EGR control means (11, 43) for controlling a flow rate of exhaust gas being recirculated through the first EGR path; a second EGR path (10) that recirculates a portion of exhaust gas downstream of the turbine into the intake path; a second EGR control means (12, 44) for controlling a flow rate of exhaust gas being recirculated through the second EGR path; and a NOx purification catalyst (31) that is provided inside of the exhaust path downstream of an exhaust gas inlet of the second EGR path, traps NOx under an oxidizing atmosphere, and purifies NOx under a reducing atmosphere, the method includes: a reduction control step (process of Step S1 in FIG. 2) of executing reduction control to make exhaust gas flowing into the NOx purification catalyst into a reducing atmosphere at a predetermined period; and an EGR switching step (processes of Steps S6 to S8 in FIG. 2) of, during execution of the reduction control, selecting recirculation control of exhaust gas by the second EGR control means in a case of the exhaust air/fuel ratio of exhaust gas flowing into the NOx purification catalyst being at least a predetermined threshold value, and selecting recirculation control of exhaust gas by the first EGR control means in a case of the exhaust air/fuel ratio of exhaust gas flowing into the NOx purification catalyst being less than the threshold value.

Effects of the Invention

According to the invention as described in the first aspect, during reduction control execution to control the exhaust gas flowing into the NOx purification catalyst to a reducing atmosphere (i.e. to enrich the exhaust air/fuel ratio), switching between recirculation control of the exhaust gas by the first EGR control means corresponding to HP-EGR and recirculation control of the exhaust gas by the second EGR control means corresponding to LP-EGR is executed according to the exhaust air/fuel ratio. More specifically, during reduction control execution, in a case of the exhaust air/fuel ratio of the exhaust gas flowing into the NOx purification catalyst being at least a predetermined threshold value, recirculation control of the exhaust gas by the second EGR control means is selected, and in a case of the exhaust air/fuel ratio being less than the predetermined threshold value, recirculation control of the exhaust gas by the first EGR control means is selected.

As described above, the temperature of the exhaust gas flowing in the second EGR path corresponding to the LP-EGR path is lower than in the first EGR path corresponding to the HP-EGR path. As a result, during reduction control execution, in a case of the exhaust air/fuel ratio being less than the predetermined threshold value, i.e. in a case of the HC amount in the exhaust gas increasing dramatically, it is possible to suppress HC adherence inside the second EGR path by selecting recirculation control of the exhaust gas by the first EGR control means.

In addition, since recirculation control of the exhaust gas by the first EGR control means is selected limiting to during an exhaust air/fuel ratio decrease in which the HC concentration in the exhaust gas is high, a decline in the charge efficiency due to unnecessary switching to the first EGR path can be suppressed, and thus high charge efficiency can be realized.

According to the second aspect of the invention, the threshold value of the exhaust air/fuel ratio, to be used in the switching determination between recirculation control of the exhaust gas by the first EGR control means and recirculation control of the exhaust gas by the second EGR control means, is set to richer with higher loads of the engine. Since the exhaust gas temperature rises with higher load of the engine, it is possible to limit to a more suitable time to select recirculation control of the exhaust gas by the first EGR control means, by setting the threshold value of the exhaust air/fuel ratio to be used in switching determination to a smaller value, i.e. to even richer. As a result, it is possible to suppress a decline in charge efficiency due to unnecessary switching to the first EGR path, as well as to suppress adherence of HC inside the second EGR path, whereby higher charge efficiency can be realized.

According to the third aspect of the invention, the threshold value of the exhaust air/fuel ratio, to be used in switching determination between recirculation control of the exhaust gas by the first EGR control means and recirculation control of the exhaust gas by the second EGR means, is set to richer with higher engine temperature of the engine. Since the HC concentration in the exhaust gas decreases with higher engine temperature of the engine, it is possible to select recirculation control of the exhaust gas by the first EGR control means limiting to a more suitable time, by setting the threshold value of the exhaust air/fuel ratio to be used in switching determination to a lower value, i.e. to even richer. As a result, it is possible to suppress a decline in charge efficiency due to unnecessary switching to the first EGR path, as well as to suppress adherence of HC inside the second EGR path, whereby higher charge efficiency can be realized.

According to the fourth aspect of the invention, the threshold value of the exhaust air/fuel ratio, to be used in switching determination between recirculation control of the exhaust gas by the first EGR control means and recirculation control of the exhaust gas by second EGR control means, is set to richer with higher cetane number of the fuel in use by the engine. Since the HC concentration in the exhaust gas decreases with higher cetane number of the fuel, it is possible to limit to a more suitable time to select recirculation control of the exhaust gas by the first EGR control means, by setting the threshold value of the exhaust air/fuel ratio to be used in switching determination to a lower value, i.e. to even richer. As a result, it is possible to suppress a decline in charge efficiency due to unnecessary switching to the first EGR path, as well as to suppress adherence of HC inside the second EGR path, whereby the higher charge efficiency can be realized.

According to the fifth aspect of the invention, upon controlling the exhaust gas flowing into the NOx purification catalyst to a reducing atmosphere, reduction control according to rich combustion and reduction control according to post rich are selectively executed, and during the execution of reduction control according to rich combustion, the threshold value of the exhaust air/fuel ratio to be used in switching determination is set to be richer than during executing of reduction control according to post rich. During rich combustion, the HC concentration in the exhaust gas is lower than during post rich; therefore, the threshold value of the exhaust air/fuel ratio to be used in switching determination can be set to a smaller value, i.e. even richer, whereby is possible to limit to a more suitable time to select recirculation control of the exhaust gas by the first EGR control means. As a result, it is possible to suppress a decline in charge efficiency due to unnecessary switching to the first EGR path, as well as to suppress adherence of HC inside the second EGR path, whereby higher charge efficiency can be realized.

According to the sixth aspect of the invention, effects similar to the invention according to the first aspect are exerted.

EXPLANATION OF REFERENCE NUMERALS

Figure 1:
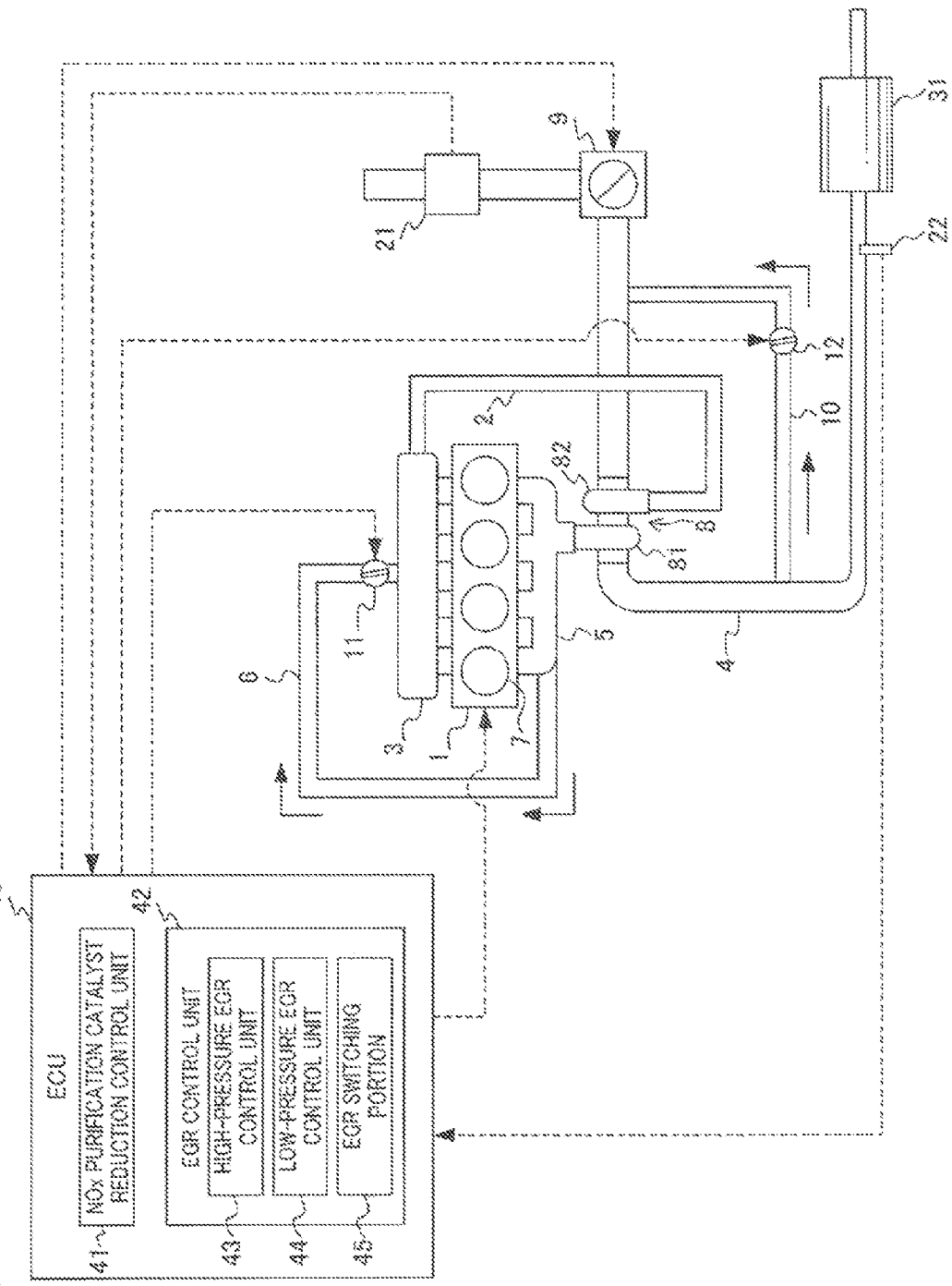
FIG. 1 is a view showing configurations of an internal combustion engine and an emission control device thereof according to an embodiment of the present invention.

1 Engine (internal combustion engine)
2 Intake plumbing (intake path)
3 Intake manifold (intake path)
4 Exhaust plumbing (exhaust path)
5 Exhaust manifold (exhaust path)
6 High-pressure EGR path (first EGR path)
11 High-pressure EGR valve (first EGR control means)
10 Low-pressure EGR path (second EGR path)
12 Low-pressure EGR valve (second EGR control means)
8 Turbocharger
81 Turbine
82 Compressor
9 Throttle valve
21 Air-flow meter
22 UEGO sensor
31 NOx purification catalyst
40 ECU (reduction control means, first EGR control means, second EGR control means, EGR switching means, threshold value setting means)

PREFERRED MODE FOR CARRYING OUT THE INVENTION

An embodiment of the present invention will be explained in detail hereinafter while referring to the drawings.

FIG. 1 is a view showing configurations of an internal combustion engine and an emission control device thereof according to an embodiment of the present invention. An internal combustion engine (hereinafter referred to as "engine") 1 is a diesel engine that directly injects fuel into the combustion chamber of each cylinder 7, and a fuel injector, which is not illustrated, is provided to each of the cylinders 7. These fuel injectors are electrically connected by an electronic control unit (hereinafter referred to as "ECU") 40, and the valve-open duration and the valve-close duration of the fuel injectors are controlled by the ECU 40.

The engine 1 is provided with intake plumbing 2 in which intake air flows, exhaust plumbing 4 in which exhaust gas flows, a turbocharger 8 that compresses and feeds intake air to the intake plumbing 2, a high-pressure EGR path 6 that recirculates a portion of the exhaust upstream of the turbine 81 of the turbocharger 8 into the intake manifold 3, and a low-pressure EGR path 10 that recirculates a portion of the exhaust downstream of the turbine 81 of the turbocharger 8 into the intake plumbing 2 at an upstream side of the turbocharger 8.

The intake plumbing 2 is connected to the intake port of each cylinder 7 of the engine 1 via a plurality of branches of an intake manifold 3. The exhaust plumbing 4 is connected to the exhaust port of each cylinder 7 of the engine 1 via a plurality of branches of an exhaust manifold 5. The high-pressure EGR path 6 branches from the exhaust manifold 5 and leads to the intake manifold 3.

The turbocharger 8 includes a turbine 81 provided to the exhaust plumbing 4 and a compressor 82 provided to the intake plumbing 2. The turbine 81 is driven by the kinetic energy of exhaust gas flowing in the exhaust plumbing 4. The compressor 82 is rotationally driven by the turbine 81, and compresses and feeds intake air into the intake plumbing 2. In addition, the turbine 81 is provided with a plurality of variable vanes, which are not illustrated, and is configured so that the turbine revolution number (revolution speed) can vary by way of causing the aperture of the variable vanes to change. The vane aperture of the turbine 81 is electromagnetically controlled by the ECU 40.

A throttle valve 9 that controls the intake air amount of the engine 1 is provided inside the intake plumbing 2 at an upstream side of the turbocharger 8. This throttle valve 9 is connected to the ECU 40 via an actuator, and the aperture thereof is electromagnetically controlled by the ECU 40. The intake air amount controlled by the throttle valve 9 is detected by an air flow meter 21.

The high-pressure EGR path 6 connects the exhaust manifold 5 and the intake manifold 3, and recirculates a portion of the exhaust emitted from the engine 1. A high-pressure EGR valve 11 that controls the flow rate of exhaust gas being recirculated is provided in the high-pressure EGR path 6. The high-pressure EGR valve 11 is connected to the ECU 40 via an actuator, which is not illustrated, and the valve aperture thereof is electromagnetically controlled by the ECU 40.

The low-pressure EGR path 10 connects the exhaust plumbing 4 and the intake plumbing 2, and recirculates a portion of the exhaust from a downstream side of the turbocharger 8 in the exhaust plumbing 4 to an upstream side of the turbocharger 8 in the intake plumbing 2. A low-pressure EGR valve 12 that controls the flow rate of exhaust gas being recirculated is provided in the low-pressure EGR path 10. The low-pressure EGR valve 12 is connected to the ECU 40 via an actuator, which is not illustrated, and the valve aperture thereof is electromagnetically controlled by the ECU 40.

A NOx purification catalyst 31 that purifies exhaust gas is provided inside the exhaust plumbing 4 at a downstream side of the turbocharger 8. The NOx purification catalyst 31 has the ability to trap NOx. Purification of NOx in the NOx purification catalyst 31 will be explained hereinafter.

First, when so-called lean burn operation is performed in the engine air/fuel ratio is leaner than the stoichiometric air/fuel ratio, the exhaust flowing into the NOx purification catalyst 31 becomes an oxidizing atmosphere. As a result thereof, NOx in the exhaust gas is trapped in the NOx purification catalyst 31.

Next, when rich operation is performed in which the engine air/fuel ratio becomes richer than the stoichiometric air/fuel ratio, the exhaust gas becomes a reducing atmosphere. As a result thereof, the NOx trapped in the NOx purification catalyst 31 is reduced and purified.

A crank angle position sensor (not illustrated) that detects the rotational angle of the crankshaft of the engine 1, an accelerator sensor (not illustrated) that detects a depression amount of the accelerator pedal of a vehicle being driven by the engine 1, a coolant temperature sensor (not illustrated) that detects the coolant temperature of the engine 1, a cylinder pressure sensor (not illustrated) that detects the pressure inside the combustion chamber of each cylinder 7 of the engine 1, the air-flow meter 21 that detects an intake air amount (air amount newly aspirated into the engine 1 per unit time) of the engine 1, an exhaust temperature sensor (not illustrated) that detects a temperature of exhaust flowing into the NOx purification catalyst 31, and a UEGO sensor (universal exhaust gas oxygen sensor) 22 that detects an oxygen concentration of the exhaust flowing into the NOx purification catalyst 31, i.e. exhaust air/fuel ratio, are connected to the ECU 40, and the detection signals of these sensors are supplied to the ECU 40.

Herein, the revolution speed of the engine 1 is calculated by the ECU 40 based on the output of the crank angle position sensor. A generated torque of the engine 1, i.e. load of the engine 1, is calculated by the ECU 40 based on the fuel injection amount of the engine 1. The fuel injection amount is calculated by the ECU 40 based on the output of the accelerator sensor. In addition, the cetane number of the fuel used in the engine 1 is calculated based on the ignition timing of fuel determined in response to the outputs of the cylinder pressure sensor and the crank angle position sensor.

The ECU 40 includes an input circuit that has functions such as of shaping input signal wave forms from every kind of sensor, correcting the voltage levels to predetermined levels, and converting analog signal values to digital signal values, and a central processing unit (hereinafter referred to as "CPU"). In addition to this, the ECU 40 includes a storage circuit that stores every kind of calculation program executed by the CPU and calculation results, and an output circuit that outputs control signals to the throttle valve 9, high-pressure EGR valve 11, low-pressure EGR valve 12, turbocharger 8, fuel injectors of the engine 1, and the like.

According to the above such hardware configuration, the modules of a NOx purification catalyst reduction control unit 41 and an EGR control unit 42 are configured in the ECU 40. The functions of each module will be explained hereinafter.

The NOx purification catalyst reduction control unit 41 executes reduction control to make the exhaust gas flowing into the NOx purification catalyst 31 into a reducing atmosphere at a predetermined time. More specifically, it estimates the NOx trapped amount that is trapped in the NOx purification catalyst 31 based on the intake air amount, fuel injection amount and the like, and in a case of the NOx trapped amount thus estimated being at least a predetermined judgment value, executes reduction control.

In the reduction control, an exhaust air/fuel ratio target value of the exhaust gas flowing into the NOx purification catalyst 31 is determined based on at least one among the exhaust gas temperature, the NOx trapped amount estimated as described above, the time executing reduction control, the revolution speed of the engine 1, and the generated torque of the engine 1. At least one among the intake air amount of the engine 1, main injection amount, post injection amount, and exhaust gas flow rate being recirculated by the high-pressure EGR path 6 or low-pressure EGR path 10 is adjusted so that the exhaust air/fuel ratio matches the exhaust air/fuel ratio target value determined.

In addition, the NOx purification catalyst reduction control unit 41 selectively executes, depending on the operating state of the engine 1, reduction control according to rich combustion to make the exhaust gas flowing into the NOx purification catalyst 31 into a reducing atmosphere by increasing the main injection amount, and reduction control according to post rich to make the exhaust gas flowing into the NOx purification catalyst 31 into a reducing atmosphere by performing post injection. More specifically, by referring to an operating state determination map established based on a predetermined experiment and in which the revolution speed of the engine 1 and the fuel injection amount stored in the ECU 40 in advance are set as parameters, it is determined if it is a high load operating state or a low load operating state based on the revolution speed of the engine 1 and the fuel injection amount, and then execution is performed selectively depending on the operating state thus determined.

The EGR control unit 42 is configured to include a high-pressure EGR control portion 43 that controls the flow rate of exhaust gas being recirculated through the high-pressure EGR path 6, and a low-pressure EGR control portion 44 that controls the flow rate of exhaust gas being recirculated through the low-pressure EGR path 10.

The high-pressure EGR control portion 43 controls the aperture of the high-pressure EGR valve 11 to control the flow rate of the exhaust gas being recirculated through the high-pressure EGR path 6. In addition, while recirculation control of the exhaust gas is being performed by this high-pressure EGR control portion 43, the low-pressure EGR valve 12 is basically closed.

The low-pressure EGR control portion 44 controls the aperture of the low-pressure EGR valve 12 to control the flow rate of the exhaust gas being recirculated through the low-pressure EGR path 10. In addition, while recirculation control of the exhaust gas is being performed by this low-pressure EGR control portion 44, the high-pressure EGR valve 11 is basically closed.

In addition to this, the EGR control unit 42 includes an EGR switching portion 45 that executes EGR switch processing to selectively switch between recirculation control of the exhaust gas by the high-pressure EGR control portion 43 and the recirculation control of the exhaust gas by the low-pressure EGR control portion 44.

During reduction control execution by the NOx purification catalyst reduction control unit 41, the EGR switching portion 45 executes switching between the recirculation control of the exhaust gas by the high-pressure EGR control portion 43 and the recirculation control of the exhaust gas by the low-pressure EGR control portion 44, in accordance with the exhaust air/fuel ratio of the exhaust gas flowing into the NOx purification catalyst 31. In this way, in a case of the exhaust air/fuel ratio of the exhaust flowing into the NOx purification catalyst 31 being at least a predetermined threshold value, switching to the low-pressure EGR path 10 is executed by the high-pressure EGR, valve 11 being closed and the low-pressure EGR valve 12 being opened. In addition, in a case of the exhaust air/fuel ratio being less than the predetermined threshold value, switching to the high-pressure EGR path 6 is executed by the low-pressure EGR valve 12 being closed and the high-pressure EGR valve 11 being opened.

Herein, although the actual value detected by the UEGO sensor 22 is used as the exhaust air/fuel ratio of the exhaust gas flowing into the NOx purification catalyst 31 in the present embodiment, it may be a target value determined in the way described above.

The above-mentioned threshold value is set to richer with higher load of the engine 1, based on the relationship between the threshold value and the load of the engine 1 established by a predetermined experiment and stored in the ECU 40 in advance. It is determined if the load of the engine 1 is a high-load operating state or a low-load operating state similarly to as described above.

In addition, the threshold value is set to richer with higher coolant temperature of the engine 1, based on the relationship between the threshold value and the coolant temperature of the engine 1 (i.e. engine temperature) established by a predetermined experiment and stored in the ECU 40 in advance.

Furthermore, the threshold value is set to richer with higher cetane number of the fuel in use by the engine 1, based on the relationship between the threshold value and the cetane number of the fuel in use established by a predetermined experiment and stored in the ECU 40 in advance.

Moreover, based on a relationship between the threshold value and the load of the engine 1 established by a predetermined experiment and stored in the ECU 40 in advance, the relationship between the threshold value and the coolant temperature of the engine 1 (i.e. engine temperature), and the relationship between the threshold value and the cetane number of the fuel in use, the above-mentioned threshold value is set during reduction control execution according to rich combustion to be richer than during reduction control execution according to post rich.

Figure 2:
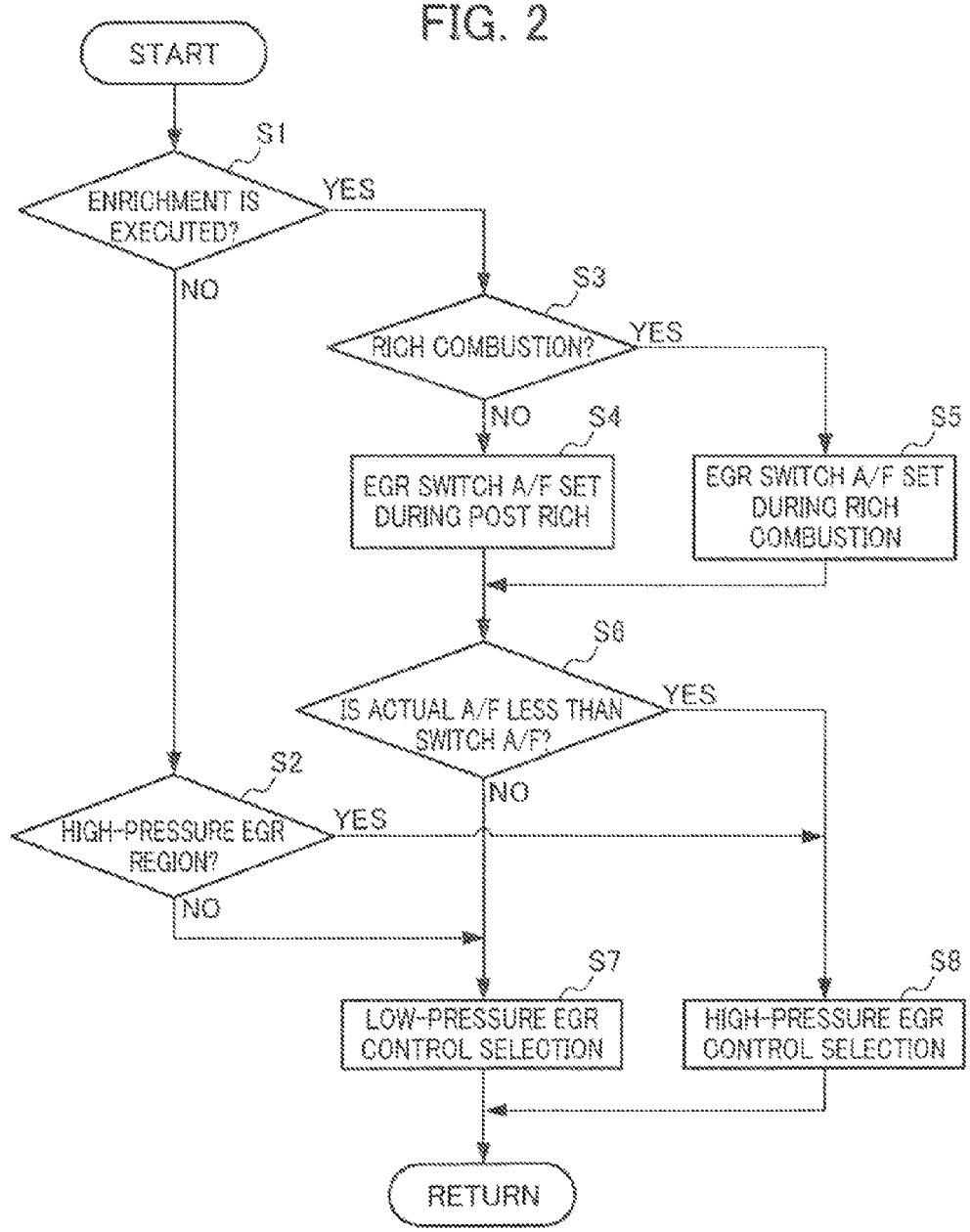
FIG. 2 is a flowchart showing a sequence of EGR switch processing by an ECU according to an embodiment of the present invention.

FIG. 2 is a flowchart showing a sequence of EGR switch processing by the ECU 40. As shown in FIG. 2, the EGR switch processing by the ECU 40 makes selection between high-pressure EGR control and low-pressure EGR control possible depending on the exhaust air/fuel ratio during enrichment execution (i.e. during reduction control execution) according to rich combustion or post rich. This EGR switch processing is repeatedly executed at a predetermined interval by the aforementioned EGR switching portion 45.

In Step S1, it is determined whether to execute enrichment; in a case of this determined being NO, Step S2 is advanced to, and in a case of being YES, Step S3 is advanced to. More specifically, the NOx trapped amount of the NOx purification catalyst 31 is estimated based on the intake air amount, fuel injection amount and the like, and enrichment is executed in a case of the NOx trapped amount thus estimated being at least a predetermined judgment value.

In Step S2, it is determined whether the current operating state is the high-pressure EGR range during enrichment non-execution. More specifically, whether or not this operating state is the high-pressure EGR region is determined based on a control map such as that shown in FIG. 3. In a case of this determination being YES, Step S8 is advanced to, and high-pressure EGR control, i.e. recirculation control of the exhaust gas through the high-pressure EGR path 6, is selected. In addition, in a case of this determination being NO, Step S7 is advanced to, and low-pressure EGR control, i.e. recirculation control of the exhaust gas through the low-pressure EGR path 10, is selected.

Figure 3:
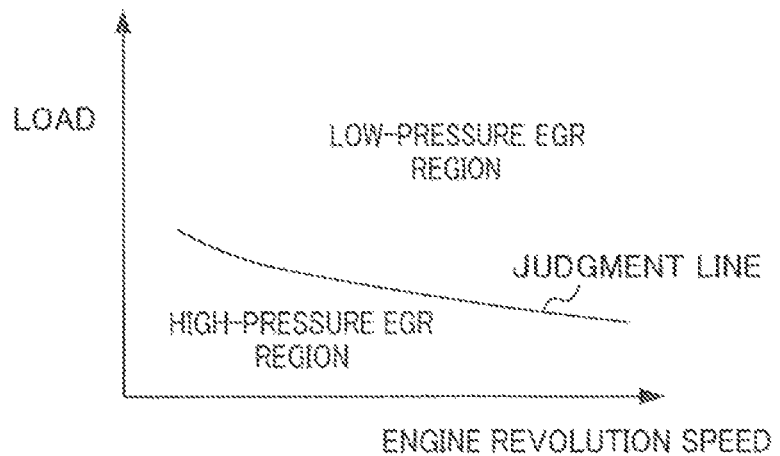
FIG. 3 is a graph showing an EGR region determination map.

FIG. 3 is a graph showing an EGR, region determination map, and is a graph showing an example of the control map that is referred to in the aforementioned Step S2. This EGR region determination map is set based on a predetermined experiment and is stored in the ECU 40.

As shown in FIG. 3, with the engine revolution speed and load set as parameters expressing the operating state, the operating state is divided into a low-pressure EGR region in which low-pressure EGR control is suited and a high-pressure EGR region in which high-pressure EGR control is suited. According to this control map, basically, high-pressure EGR control is selected in a case of the load being low, and low-pressure EGR control is selected in a case of the load being high. In addition, the judgment line dividing the high-pressure EGR region and the low-pressure EGR region becomes lower as the engine revolution speed increases. In other words, when the engine revolution speed increases, low-pressure EGR control is selected even at low load.

Referring back to FIG. 2, in Step S3, it is determined whether the enrichment being executed is rich combustion. In a case of this determination being NO, Step S4 is advanced to, and in a case of being YES, Step S5 is advanced to.

In Step S4, the EGR switch A/F to be used in the determination of selection between high-pressure EGR control and low-pressure EGR control during post rich execution is set, and the Step S6 is advanced to. More specifically, based on the relationship between the EGR switch A/F and the load of the engine 1 established by a predetermined experiment and stored in the ECU 40 in advance (refer to FIG. 4), the EGR switch A/F is set to richer with higher load of the engine 1. In addition, based on the relationship between the EGR switch A/F and coolant temperature of the engine 1 (hereinafter referred to as "engine water temperature") established by a predetermined experiment and stored in the ECU 40 in advance (refer to FIG. 5), the EGR switch A/F is corrected and set to even richer with higher engine water temperature. Furthermore, based on the relationship between the EGR switch A/F and the cetane number of fuel in use by the engine 1 established by a predetermined experiment and stored in the ECU 40 in advance (refer to FIG. 6), the EGR switch A/F is corrected and set to even further rich with higher cetane number.

It should be noted that, based on FIGS. 4 to 6, the EGR switch A/F during post rich execution is set to be leaner than the EGR, switch A/F during rich combustion execution described later.

In Step S5, the EGR switch A/F to be used in the determination of selection between high-pressure EGR control and low-pressure EGR control during rich combustion execution is set, and then Step S6 is advanced to. More specifically, based on FIG. 4, the EGR switch A/F is set to richer with higher load of the engine 1, similarly to the above-mentioned Step S4. In addition, based on FIG. 5, the EGR switch A/F is corrected and set to even richer with higher engine water temperature. Moreover, based on FIG. 6, the EGR switch A/F is corrected and set to even further rich with higher cetane number.

Figure 4:
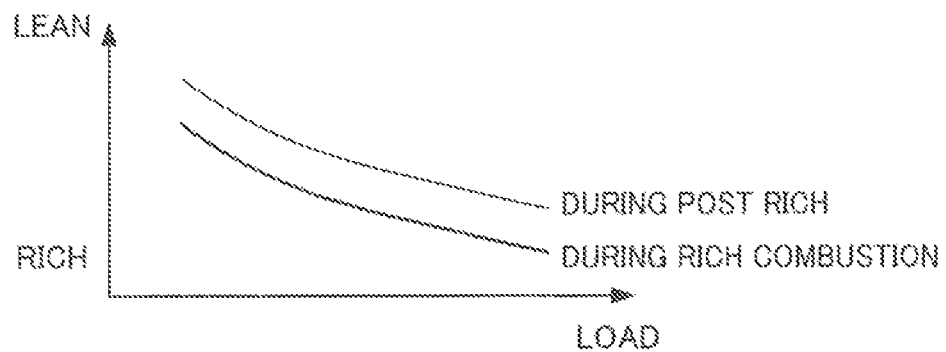
FIG. 4 is a graph showing a relationship between EGR switch A/F and engine load.
Figure 5:
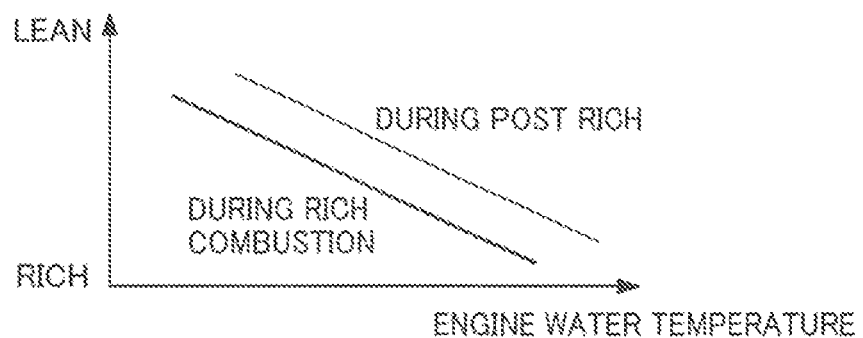
FIG. 5 is a graph showing a relationship between EGR switch A/F and engine water temperature.
Figure 6:
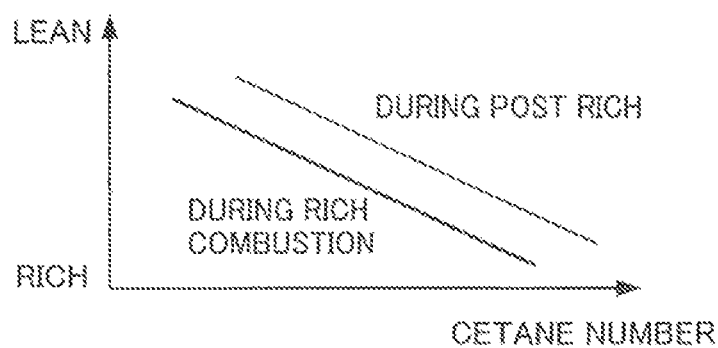
FIG. 6 is a graph showing a relationship between engine switch A/F and the cetane number of fuel.

It should be noted that, based on FIGS. 4 to 6, the EGR switch A/F during rich combustion execution is set to be richer than the EGR switch A/F during the aforementioned post rich execution.

In Step S6, it is determined whether the actual A/F of the exhaust gas flowing into the NOx purification catalyst 31 is lower than the EGR switch A/F set in Step S4 or Step S5. In a case of this determination being NO, Step S7 is advanced to, and in a case of being YES, Step S8 is advanced to.

In Step S7, low-pressure EGR control, i.e. recirculation control of the exhaust gas through the low-pressure EGR path 10, is selected, and the EGR switch processing by the ECU 40 is ended.

In Step S8, high-pressure EGR control, i.e. recirculation control of the exhaust gas through the high-pressure EGR path 6, is selected, and the EGR switch processing by the ECU 40 is ended.

As described in detail above, according to the present embodiment, during reduction control execution to control the exhaust gas flowing into the NOx purification catalyst 31 to a reducing atmosphere (i.e. to enrich the exhaust air/fuel ratio), switching between recirculation control of the exhaust gas by the high-pressure EGR control portion 43 and recirculation control of the exhaust gas by the low-pressure EGR control portion 44 is executed according to the exhaust air/fuel ratio. More specifically, during reduction control execution, in a case of the exhaust air/fuel ratio of the exhaust gas flowing into the NOx purification catalyst 31 being at least a predetermined threshold value, recirculation control of the exhaust gas by the low-pressure EGR control portion 44 is selected, and in a case of the exhaust air/fuel ratio being less than the predetermined threshold value, recirculation control of the exhaust gas by the high-pressure EGR control portion 43 is selected.

As described above, the temperature of the exhaust gas flowing in the low-pressure EGR path 10 is lower than in the high-pressure EGR path 6. As a result, during reduction control execution, in a case of the exhaust air/fuel ratio being less than the predetermined threshold value, i.e. in a case of the HC amount in the exhaust gas increasing dramatically, it is possible to suppress HC adherence inside the low-pressure EGR path 10 by selecting the recirculation control of the exhaust gas by the high-pressure EGR control portion 43.

In addition, since recirculation control of the exhaust gas by the high-pressure EGR control portion 43 is selected limiting to during an exhaust air/fuel ratio decrease in which the HC concentration in the exhaust gas is high, a decline in the charge efficiency due to unnecessary switching to the high-pressure EGR path 6 can be suppressed, and thus high charge efficiency can be realized.

In addition, according to the present embodiment, the threshold value of the exhaust air/fuel ratio to be used in the determination of selection between recirculation control of the exhaust gas by the high-pressure EGR control portion 43 and recirculation control of the exhaust gas by the low-pressure EGR control portion 44 is set to richer with higher load of the engine 1. Since the HC concentration in the exhaust gas declines with higher load of the engine 1, it is possible to limit to a more suitable time to select recirculation control of the exhaust gas by the high-pressure EGR control portion 43, by setting the threshold value of the exhaust air/fuel ratio to be used in determination to a smaller value, i.e. to even richer. As a result, it is possible to suppress a decline in charge efficiency due to unnecessary switching to the high-pressure EGR path 6, as well as to suppress adherence of HC inside the low-pressure EGR path 10, whereby higher charge efficiency can be realized.

In addition, according to the present embodiment, the threshold value of the exhaust air/fuel ratio to be used in the determination of selection between recirculation control of the exhaust gas by the high-pressure EGR control portion 43 and recirculation control of the exhaust gas by the low-pressure EGR control portion 44 is set to richer with higher engine temperature of the engine 1. Since the HC concentration in the exhaust gas decreases with higher engine temperature of the engine 1, it is possible to limit to a more suitable time to select recirculation control of the exhaust gas by the high-pressure EGR control portion 43, by setting the threshold value of the exhaust air/fuel ratio to be used in determination to a lower value, i.e. to even richer. As a result, it is possible to suppress a decline in charge efficiency due to unnecessary switching to the high-pressure EGR path 6, as well as to suppress adherence of HC inside the low-pressure EGR path 10, whereby higher charge efficiency can be realized.

In addition, according to the present embodiment, the threshold value of the exhaust air/fuel ratio to be used in the determination of selection between recirculation control of the exhaust gas by the high-pressure EGR control portion 43 and recirculation control of the exhaust gas by the low-temperature EGR control portion 44 is set to richer with higher cetane number of the fuel in use by the engine 1. Since the HC concentration in the exhaust gas decreases with higher cetane number of the fuel, it is possible to limit to a more suitable time to select recirculation control of the exhaust gas by the high-pressure EGR control portion 43, by setting the threshold value of the exhaust air/fuel ratio to be used in determination to a lower value, i.e. to even richer. As a result, it is possible to suppress a decline in charge efficiency due to unnecessary switching to the high-pressure EGR path 6, as well as to suppress adherence of HC inside the low-pressure EGR path 10, whereby higher charge efficiency can be realized.

In addition, according to the present embodiment, upon controlling the exhaust gas flowing into the NOx purification catalyst 31 to a reducing atmosphere, reduction control according to rich combustion and reduction control according to post rich are selectively executed, and during the execution of reduction control according to rich combustion, the threshold value of the exhaust air/fuel ratio to be used in determination is set to be richer than during execution of reduction control according to post rich. During rich combustion, the HC concentration in the exhaust gas is lower than during post rich; therefore, the threshold value of the exhaust air/fuel ratio to be used in determination can be set to a smaller value, i.e. even richer, whereby it is possible to limit to a more suitable time to select recirculation control of the exhaust gas by the high-pressure EGR control portion 43. As a result, it is possible to suppress a decline in charge efficiency due to unnecessary switching to the high-pressure EGR path 6, as well as to suppress adherence of HC inside the low-pressure EGR path 10, whereby higher charge efficiency can be realized.

In the present embodiment, the ECU 40 configures a portion of a first EGR control means, a portion of a second EGR control means, an EGR switching means, a reduction control means, and a threshold value setting means. More specifically, the high-pressure EGR control portion 43 of the ECU 40 and high-pressure EGR valve 11 correspond to the first EGR control means; the low-pressure EGR control portion 44 of the ECU 40 and the low-pressure EGR valve 12 correspond to the second EGR control means; the EGR switching portion 45 of the ECU 40 corresponds to the EGR switching means; and the NOx purification catalyst reduction control unit 41 of the ECU 40 corresponds to the reduction control means. In addition, means related to the execution of Step S4 and Step S5 of FIG. 2 correspond to the threshold value setting means.

It should be noted that the present invention is not to be limited to the above-mentioned embodiment, and modifications, improvements and the like within a scope that can achieve the object of the present invention are included in the present invention. For example, the EGR switch processing according to the present invention is not only for a case of removing NOx trapped in a NOx purification catalyst, but can also be applied to a case of removing sulfur trapped in a NOx purification catalyst.

The invention claimed is:

1. An exhaust emission control device for an internal combustion engine equipped with a turbocharger that drives a compressor provided in an intake path of the internal combustion engine by way of rotation of a turbine provided in an exhaust path of the internal combustion engine, the device comprising:
 a first EGR path that recirculates a portion of exhaust gas upstream of the turbine into the intake path;
 a first EGR control means for controlling a flow rate of exhaust gas being recirculated through the first EGR path;
 a second EGR path that recirculates a portion of exhaust gas downstream of the turbine into the intake path;
 a second EGR control means for controlling a flow rate of exhaust gas being recirculated through the second EGR path;
 a NOx purification catalyst that is provided inside of the exhaust path downstream of an exhaust gas inlet of the second EGR path, traps NOx under an oxidizing atmosphere, and purifies NOx under a reducing atmosphere;
 a reduction control means for executing reduction control to make exhaust gas flowing into the NOx purification catalyst into a reducing atmosphere at a predetermined time; and
 an EGR switching means for selecting recirculation control of exhaust gas by the second EGR control means in a case of the exhaust air/fuel ratio of exhaust gas flowing into the NOx purification catalyst being at least a predetermined threshold value, and for selecting recirculation control of exhaust gas by the first EGR control means in a case of the exhaust air/fuel ratio of exhaust gas flowing into the NOx purification catalyst being less than the threshold value, during execution of the reduction control.

2. An exhaust emission control device for an internal combustion engine according to claim 1, further comprising a threshold value setting means for setting the threshold value, wherein the threshold value setting means sets the threshold value to be richer with higher load of the internal combustion engine.

3. An exhaust emission control device for an internal combustion engine according to claim 2, wherein the threshold value setting means sets the threshold value to be richer with higher engine temperature of the internal combustion engine.

4. An exhaust emission control device for an internal combustion engine according to claim 2, wherein the threshold value setting means sets the threshold value to be richer with higher cetane number of fuel in use by the internal combustion engine.

5. An exhaust emission control device for an internal combustion engine according to claim 2,
 wherein the reduction control means selectively executes, according to an operating state of the internal combustion engine: reduction control according to rich combustion to make exhaust gas flowing into the NOx purification catalyst into a reducing atmosphere by increasing a main injection amount; and reduction control according to post rich to make the exhaust gas flowing into the NOx purification catalyst into a reducing atmosphere by performing post injection, and
 wherein the threshold value setting means sets the threshold value during execution of the reduction control according to rich combustion to be richer than during execution of the reduction control according to post rich.

6. An exhaust emission control method for an internal combustion engine including:
- a turbocharger that drives a compressor provided in an intake path of the internal combustion engine by way of rotation of a turbine provided in an exhaust path of the internal combustion engine;
- a first EGR path that recirculates a portion of exhaust gas upstream of the turbine into the intake path;
- a first EGR control means for controlling a flow rate of exhaust gas being recirculated through the first EGR path;
- a second EGR path that recirculates a portion of exhaust gas downstream of the turbine into the intake path;
- a second EGR control means for controlling a flow rate of exhaust gas being recirculated through the second EGR path; and
- a NOx purification catalyst that is provided inside of the exhaust path downstream of an exhaust gas inlet of the second EGR path, traps NOx under an oxidizing atmosphere, and purifies NOx under a reducing atmosphere, the method comprising:

a reduction control step of executing reduction control to make exhaust gas flowing into the NOx purification catalyst into a reducing atmosphere at a predetermined period; and an EGR switching step of, during execution of the reduction control, selecting recirculation control of exhaust gas by the second EGR control means in a case of the exhaust air/fuel ratio of exhaust gas flowing into the NOx purification catalyst being at least a predetermined threshold value, and selecting recirculation control of exhaust gas by the first EGR control means in a case of the exhaust air/fuel ratio of exhaust gas flowing into the NOx purification catalyst being less than the threshold value.

* * * * *